(12) United States Patent
Saito

(10) Patent No.: US 10,071,864 B2
(45) Date of Patent: Sep. 11, 2018

(54) PALLET CARRYING APPARATUS AND PALLET CARRYING METHOD

(71) Applicant: NITTOKU ENGINEERING CO., LTD., Saitama-shi (JP)

(72) Inventor: Hirobumi Saito, Fukushima (JP)

(73) Assignee: NITTOKU ENGINEERING CO., LTD., Saitama-Shi (JP)

( * ) Notice: Subject to any disclaimer, the term of this patent is extended or adjusted under 35 U.S.C. 154(b) by 178 days.

(21) Appl. No.: 14/414,465

(22) PCT Filed: Mar. 18, 2014

(86) PCT No.: PCT/JP2014/057240
§ 371 (c)(1),
(2) Date: Jan. 13, 2015

(87) PCT Pub. No.: WO2014/162863
PCT Pub. Date: Oct. 9, 2014

(65) Prior Publication Data
US 2015/0175362 A1    Jun. 25, 2015

(30) Foreign Application Priority Data

Apr. 5, 2013 (JP) .................. 2013-079268

(51) Int. Cl.
*B23Q 7/00* (2006.01)
*B65G 37/00* (2006.01)
(Continued)

(52) U.S. Cl.
CPC ............. *B65G 37/00* (2013.01); *B23Q 7/005* (2013.01); *B23Q 7/1421* (2013.01);
(Continued)

(58) Field of Classification Search
CPC ......... B25B 1/00; B25B 1/2484; B25B 11/02; B25B 33/005; B65G 37/00; B23Q 7/1426; B23Q 16/08
(Continued)

(56) References Cited

U.S. PATENT DOCUMENTS 6,202,824 B1 * 3/2001 Goss .................... B23Q 7/1442
198/346.1
7,748,514 B2 * 7/2010 Shimizu ................. B65G 47/46
198/346.1
(Continued)

FOREIGN PATENT DOCUMENTS

CN        102774627 A     11/2012
JP        02-018210 A      1/1990
(Continued)

*Primary Examiner* — David Bryant
*Assistant Examiner* — Nirvana Deonauth
(74) *Attorney, Agent, or Firm* — Rabin & Berdo, P.C.

(57) ABSTRACT

A pallet carrying apparatus includes: a first pallet rail; a second pallet rail provided parallel to the first pallet rail; a first pallet feeding mechanism including a first endless belt on which convex portions and concave portions each extending in a belt width direction are formed; a second pallet feeding mechanism including a second endless belt on which convex portions and concave portions each extending in a belt width direction are formed; and a pallet moving mechanism configured to move a pallet. The first and second endless belt are provided in the vertical direction. Concavoconvex portions included in the pallet engage with the convex portions and the concave portions of the first and second endless belts.

5 Claims, 6 Drawing Sheets

(51) Int. Cl.
*B23Q 16/08* (2006.01)
*B23Q 7/14* (2006.01)

(52) U.S. Cl.
CPC ......... *B23Q 7/1426* (2013.01); *B23Q 7/1447* (2013.01); *B23Q 16/08* (2013.01)

(58) Field of Classification Search
USPC .......... 198/343.1, 346.1; 414/416.01, 416.05
See application file for complete search history.

(56) References Cited

U.S. PATENT DOCUMENTS

2010/0276255 A1* 11/2010 Staunton .............. B23Q 7/1447
 198/750.1
2011/0100783 A1* 5/2011 Baba ...................... B65G 35/06
 198/606

FOREIGN PATENT DOCUMENTS

| | | |
|---|---|---|
| JP | 2011-093032 A | 5/2011 |
| JP | 2011-189999 A | 9/2011 |
| TW | 201311536 A | 3/2013 |

* cited by examiner ated and the concavo-convex portions of the pallet engage with the convex portions and the concave portions of the second endless belt; and a second pallet moving step in which the pallet is lowered from the second pallet rail to the first pallet rail by the pallet moving mechanism so that engagement between the concavo-convex portions of the pallet and the convex portions and the concave portions of the second endless belt is released and the concavo-convex portions of the pallet engage with the convex portions and the concave portions of the first endless belt.
PALLET CARRYING APPARATUS AND PALLET CARRYING METHOD

TECHNICAL FIELD

The present invention relates to a pallet carrying apparatus and a pallet carrying method for carrying one or more pallets, on which a workpiece can be placed, along a predetermined track.

BACKGROUND ART

A conventional pallet carrying apparatus provided on a manufacturing line carries a pallet while a workpiece for which processing is required is placed on the pallet. A machine tool is provided in the pallet carrying apparatus, and the machine tool performs predetermined processing to the placed workpiece. Japanese Patent Application Publication No. 2011-93032A discloses a pallet carrying apparatus that carries a plurality of pallets on each of which a workpiece can be placed around a square track in a horizontal plane relative to a machine tool.

The pallet carrying apparatus includes rear side and front side pallet rails extending parallel to each other, and a pallet moving mechanism that moves a pallet placed on one of the rear side and front side pallet rails to the other. Each pallet engages with an endless belt that circulates within the pallet carrying apparatus. The pallet carrying apparatus carries each pallet along the rear side and front side pallet rails.

SUMMARY OF INVENTION

However, in the pallet carrying apparatus described above, a plurality of machine tools are disposed between the rear side pallet rail and the front side pallet rail. Therefore, in a case where the machine tools become comparatively large apparatuses, a distance in a horizontal direction between the rear side pallet rail and the front side pallet rail increases. When the distance between the rear side pallet rail and the front side pallet rail increases in this manner, there is a problem that an occupied area of the pallet carrying apparatus, including the rear side and front side pallet rails, increases.

Further, in a case where the distance between the rear side pallet rail and the front side pallet rail increases, a pallet moving time required when the pallet moving mechanism moves a pallet mounted on one of the pallet rails to the other pallet rail lengthens.

It is an object of the present invention to provide a pallet carrying apparatus and a pallet carrying method capable of carrying a pallet rapidly without increasing an occupied area of the pallet carrying apparatus.

According to an aspect of the present invention, there is provided a pallet carrying apparatus configured to carry one or more pallets on which a workpiece can be placed, including: a first pallet rail on which the pallet is movably mounted; a second pallet rail on which the pallet is movably mounted, the second pallet rail being provided parallel to the first pallet rail at a predetermined interval in a vertical direction; a first pallet feeding mechanism including a first endless belt, the first endless belt being configured to circulate along the first pallet rail, convex portions and concave portions being formed on the first endless belt continuously and alternately in a belt longitudinal direction so that each of the convex portions and the concave portions extends in a belt width direction; a second pallet feeding mechanism including a second endless belt, the second endless belt being configured to circulate along the second pallet rail, convex portions and concave portions being formed continuously and alternately in the belt longitudinal direction so that each of the convex portions and the concave portions extends in the belt width direction; and a pallet moving mechanism configured to move the pallet from one of the first pallet rail and the second pallet rail to the other of the first pallet rail and the second pallet rail. In this case, the first endless belt and the second endless belt are provided at a predetermined interval in the vertical direction, and disposed so that each of the belt width direction thereof corresponds with the vertical direction. Further, the pallet includes concavo-convex portions configured to engage with the convex portions and the concave portions of the first endless belt in a case where the pallet is lowered to the first pallet rail by the pallet moving mechanism, and to engage with the convex portions and the concave portions of the second endless belt in a case where the pallet is raised to the second pallet rail by the pallet moving mechanism.

Further, according to another aspect of the present invention, there is provided a pallet carrying method using the pallet carrying apparatus as mentioned above, including: a first pallet carrying step in which the pallet that engages with the first endless belt is carried along the first pallet rail by the first pallet feeding mechanism; a second pallet carrying step in which the pallet that engages with the second endless belt is carried along the second pallet rail by the second pallet feeding mechanism; a first pallet moving step in which the pallet is raised from the first pallet rail to the second pallet rail by the pallet moving mechanism so that engagement between the concavo-convex portions of the pallet and the convex portions and the concave portions of the first endless belt is released and the concavo-convex portions of the pallet engage with the convex portions and the concave portions of the second endless belt; and a second pallet moving step in which the pallet is lowered from the second pallet rail to the first pallet rail by the pallet moving mechanism so that engagement between the concavo-convex portions of the pallet and the convex portions and the concave portions of the second endless belt is released and the concavo-convex portions of the pallet engage with the convex portions and the concave portions of the first endless belt.

DESCRIPTION OF EMBODIMENTS

Hereinafter, an embodiment of the present invention will be described with reference to the drawings.

Referring to FIGS. 1 to 6, a pallet carrying apparatus 10 according to an embodiment of the present invention will be described. In each figure, three mutually orthogonal axes, that is, an X axis, a Y axis, and a Z axis, are set. The X axis denotes a horizontal lateral direction, and the Y axis denotes a horizontal front-rear direction. Further, the Z axis denotes a vertical direction (an up-down direction).

Figure 6:
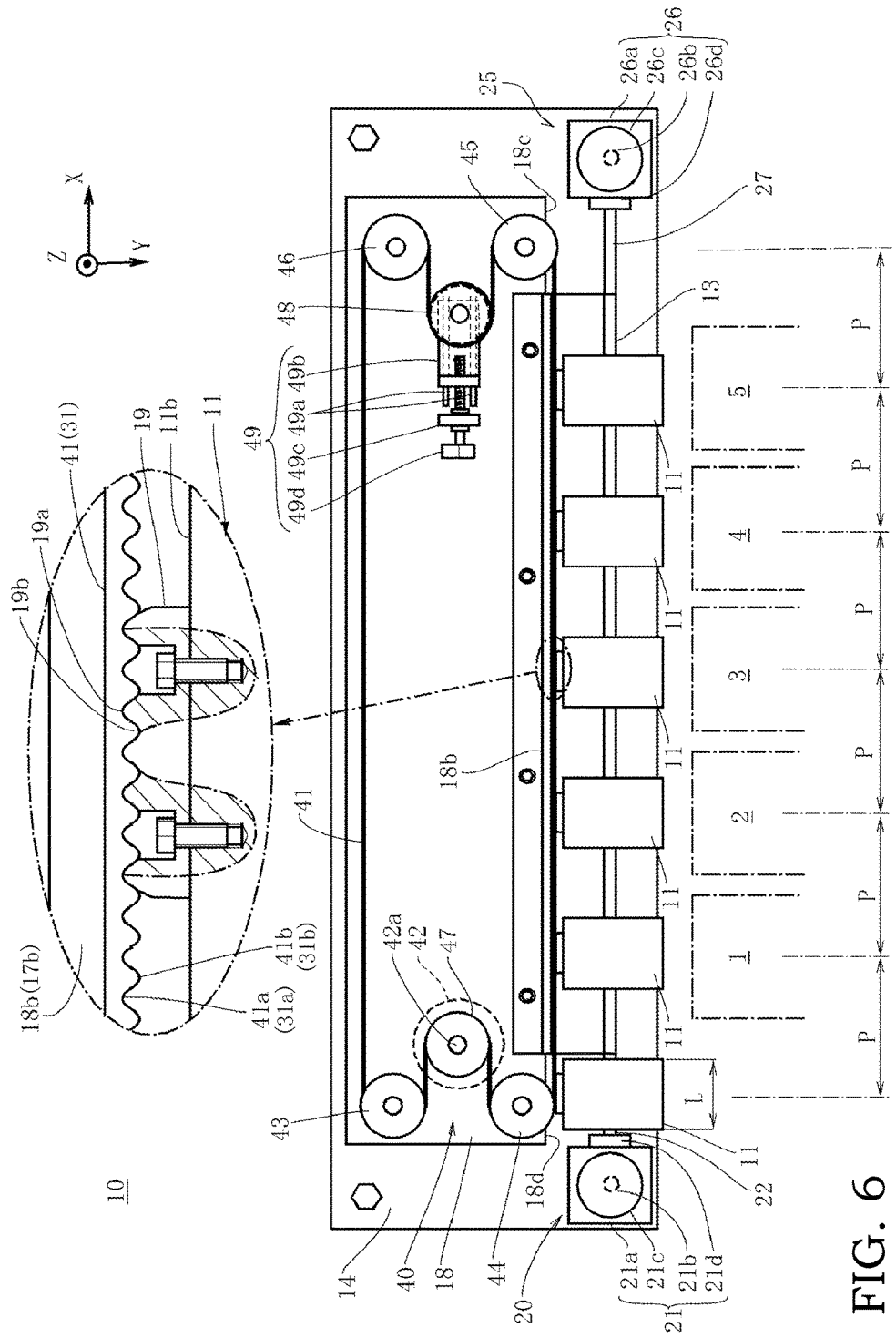
FIG. 6 is a plan view of the pallet carrying apparatus.

The pallet carrying apparatus 10 is a carrying apparatus provided on a line for manufacturing a stator of a motor or the like, for example. As shown in FIG. 6, the pallet carrying apparatus 10 includes five machine tools 1 to 5. The machine tools 1 to 5 are arranged in series at a predetermined pitch P in an X axis direction.

The respective machine tools 1 to 5 in turn carry out various types of processing, such as inserting an insulating member, swaging and welding lead wires for coils of respective phases, onto a workpiece carried by the pallet carrying apparatus 10. The stator is manufactured automatically by the machine tools 1 to 5.

The pallet carrying apparatus 10 carries a plurality of pallets 11 in order to transport workpieces placed on these pallets 11 to the respective machine tools 1 to 5. The pallet carrying apparatus 10 holds the workpieces at predetermined positions using the pallets 11 during the processing performed by the respective machine tools 1 to 5. It should be noted that the number of pallets 11 is set to one or more in accordance with the number of machine tools 1 to 5.

Figure 1:
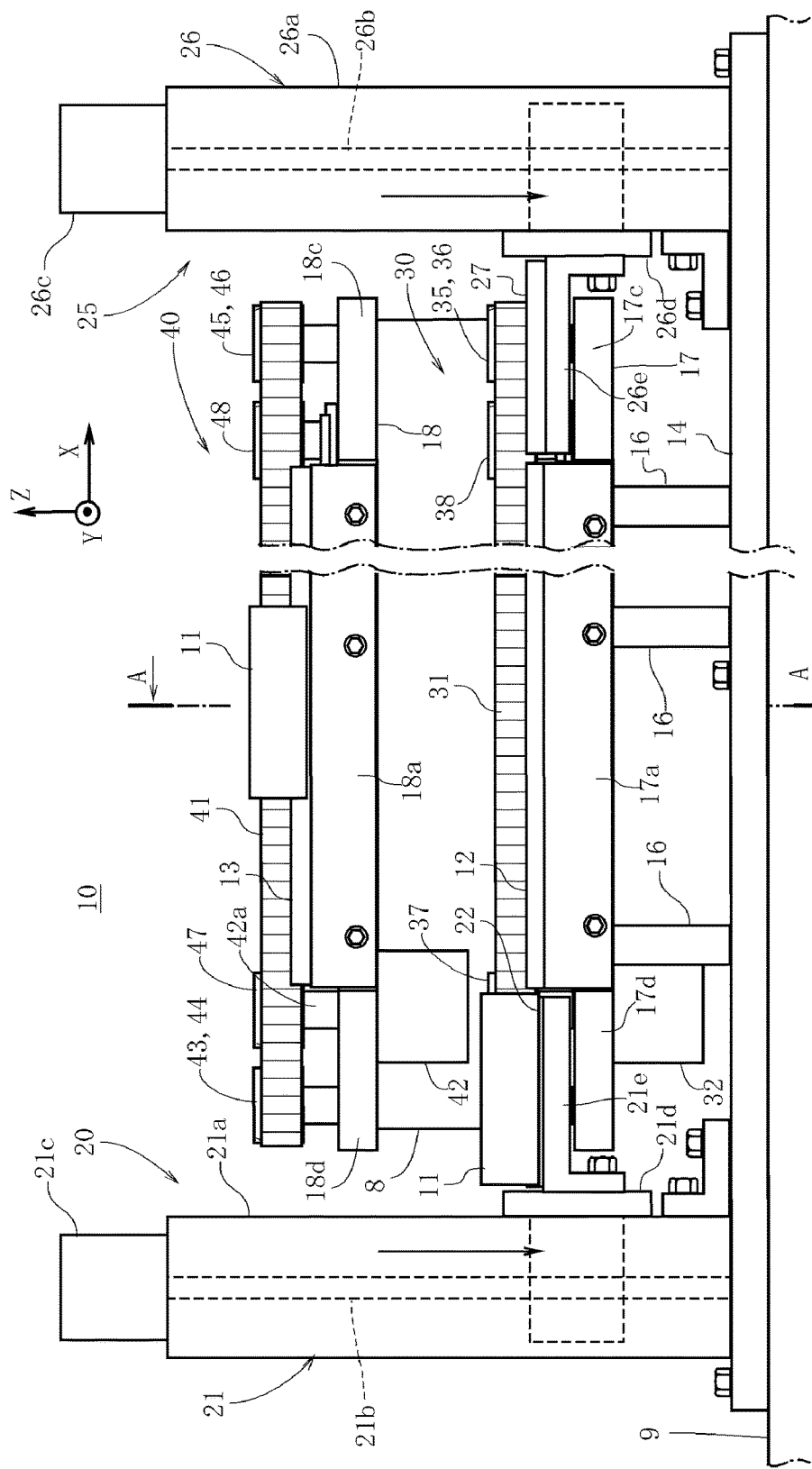
FIG. 1 is a front view of a pallet carrying apparatus according to an embodiment of the present invention.

As shown in FIG. 1, the pallet carrying apparatus 10 includes first and second pallet rails 12, 13 extending in the X axis direction. The first pallet rail 12 and the second pallet rail 13 are disposed parallel to each other at a predetermined interval in the vertical direction (the up-down direction). Further, the first pallet rail 12 and the second pallet rail 13 are disposed substantially parallel to the respective machine tools 1 to 5 (see FIG. 6) arranged in a straight line in the X axis direction. The machine tools 1 to 5 are disposed on a front side or a rear side of the first pallet rail 12 and the second pallet rail 13.

Figure 5:
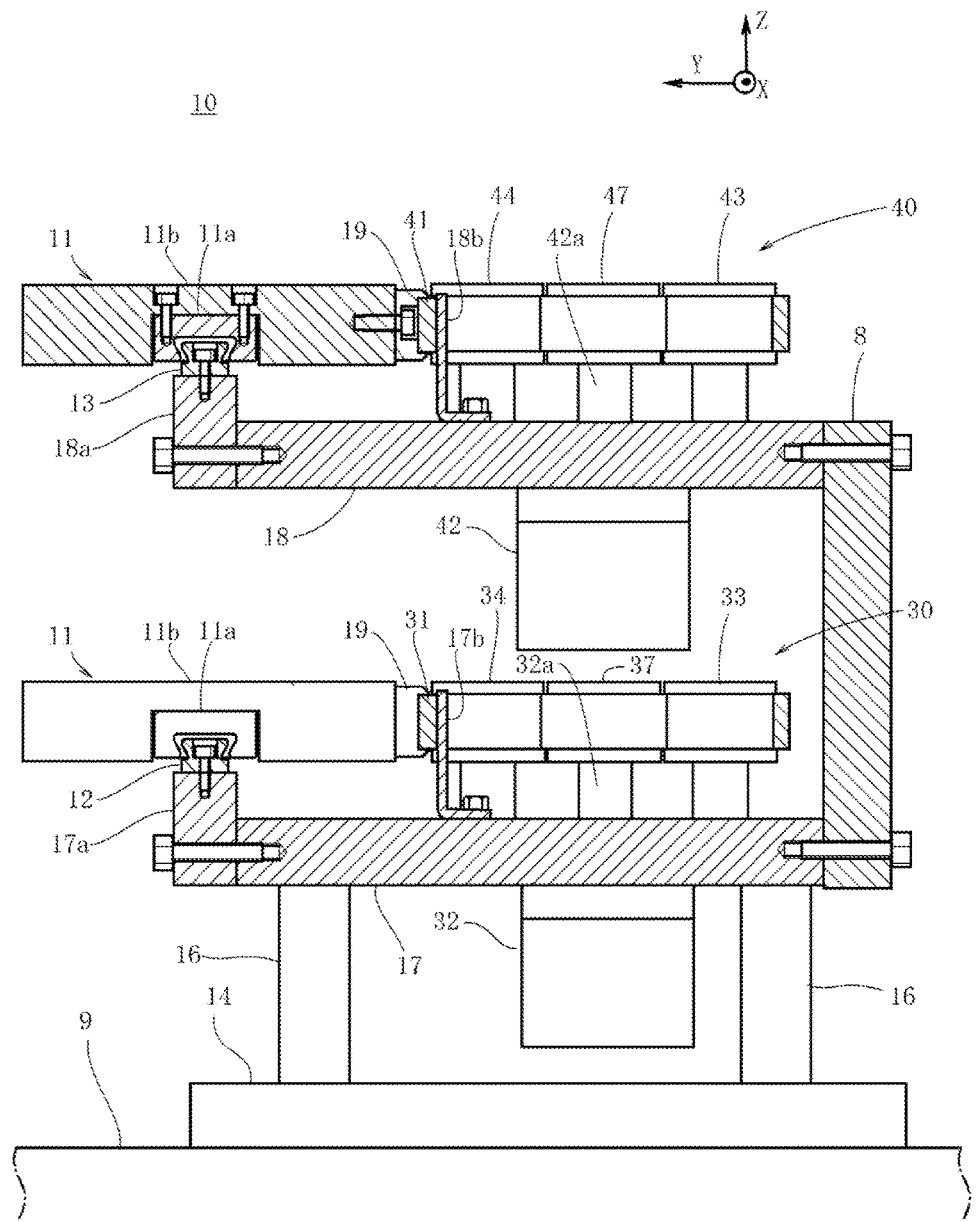
FIG. 5 is a longitudinal sectional view of the pallet carrying apparatus taken along an A-A line in FIG. 1.

As shown in FIGS. 1 and 5, the pallet carrying apparatus 10 includes an attachment plate 14 fixed horizontally to an upper surface of a frame 9, a first horizontal plate 17 attached horizontally to the attachment plate 14 via poles 16, and a second horizontal plate 17 disposed horizontally above the first horizontal plate 17 at a predetermined interval.

A side wall plate 8 is attached to one side portion of the first horizontal plate 17 and the second horizontal plate 18 in the Y axis direction of so as to couple the first and second horizontal plates 17, 18 to each other. This side wall plate 8 causes the first horizontal plate 17 and the second horizontal plate 18 to be disposed parallel to each other at a predetermined interval in the vertical direction.

First and second support plates 17a, 18a are respectively fixed to the other side portion of the first and second horizontal plates 17, 18 in the Y axis direction so as to extend along a longitudinal direction. The first pallet rail 12 is screwed fixedly to an upper surface of the first support plate 17a, and the second pallet rail 13 is screwed fixedly to an upper surface of the second support plate 18a. Each of the first and second pallet rails 12, 13 is constituted by a commercially available linear motion guide rail.

As shown in FIG. 5, the pallet 11 is formed so as to straddle the first and second pallet rails 12, 13, and includes a linear motion block 11a capable of moving on the rails 12, 13 and a seat 11b screwed to the block 11a. It should be noted that a locking member 19 is provided on a side surface of the seat 11b on the side wall plate 8 side.

The linear motion block 11a of the pallet 11 is a component that corresponds to the linear motion guide rail, and includes a roller retainer. Usage of the linear motion block 11a including the roller retainer causes the pallet 11 to be mounted movably with respect to the first and second pallet rails 12, 13. The linear motion block 11a prohibits movement of the pallet 11 in a width direction (the Y axis direction), and reduces resistance that occurs when the pallet 11 moves along the first and second pallet rails 12, 13.

As shown in FIG. 6, a length L of the pallet 11 in the X axis direction (a length of the seat 11b) is set to be the same as or shorter than the pitch P serving as the interval at which the respective machine tools 1 to 5 are disposed. In the pallet carrying apparatus 10, the plurality of pallets 11 are moved along the second pallet rail 13 in accordance with the pitch P, and the workpieces placed on the pallets 11 thereby oppose the respective machine tools 1 to 5.

As shown in FIGS. 1 to 4, the pallet carrying apparatus 10 further includes pallet moving mechanisms 20, 25 that move a pallet 11 mounted on one of the first pallet rail 12 and the second pallet rail 13 to the other of the first pallet rail 12 and the second pallet rail 13.

The pallet moving mechanisms are constituted by a first pallet moving mechanism 20 and a second pallet moving mechanism 25. The first pallet moving mechanism 20 moves the pallet 11 from the second pallet rail 13 to the first pallet rail 12. The second pallet moving mechanism 25 moves the pallet 11 from the first pallet rail 12 to the second pallet rail 13. The first and second pallet moving mechanisms 20, 25 are provided so as to sandwich the first and second pallet rails 12, 13 from both sides in the longitudinal direction (the X axis direction). In other words, the first pallet moving mechanism 20 is disposed on a side of one end of each of the first and second pallet rails 12, 13, and the second pallet moving mechanism 25 is disposed on a side of the other end of each of the first and second pallet rails 12, 13.

The first and second pallet moving mechanisms 20, 25 have a symmetrical structure, and as shown in FIG. 1, respectively include elevating actuators 21, 26 attached to the attachment plate 14 so as to stand up in the vertical direction.

The elevating actuator 21 (a first elevating actuator) includes: an elongated box-shaped housing 21a that stands upright in the vertical direction (the Z axis direction) from the attachment plate 14; a ball screw 21b provided in the housing 21a so as to extend in the vertical direction; a servo motor 21c that rotatively drives the ball screw 21b; and a follower 21d that is screwed to the ball screw 21b so as to move up and down in the vertical direction in response to rotation of the ball screw 21b. Similarly, the elevating actuator 26 (a second elevating actuator) includes: an elongated box-shaped housing 26a that stands upright in the vertical direction (the Z axis direction) from the attachment plate 14; a ball screw 26b provided in the housing 26a so as to extend in the vertical direction; a servo motor 26c that rotatively drives the ball screw 26b; and a follower 26d that is screwed to the ball screw 26b so as to move up and down in the vertical direction in response to rotation of the ball screw 26b.

Further, the first pallet moving mechanism 20 further includes a first movable rail 22 on which the pallet 11 can be mounted, and the second pallet moving mechanism 25 further includes a second movable rail 27 on which the pallet 11 can be mounted.

The first movable rail 22 is attached horizontally to the follower 21d of the elevating actuator 21 via an L-shaped attachment member 21e so as to extend in the Y axis direction. The second movable rail 27 is attached horizontally to the follower 26d of the elevating actuator 26 via an L-shaped attachment member 26e so as to extend in the Y axis direction. In the pallet carrying apparatus 10, when the servo motors 21c, 26c are respectively driven to rotate the ball screws 21b, 26b so that the followers 21d, 26d screwed to the ball screws 21b, 26b move up and down, the first and second movable rails 22, 27 also move up and down together with the followers 21d, 26d, as shown by solid arrows in FIGS. 1 and 3.

Figure 2:
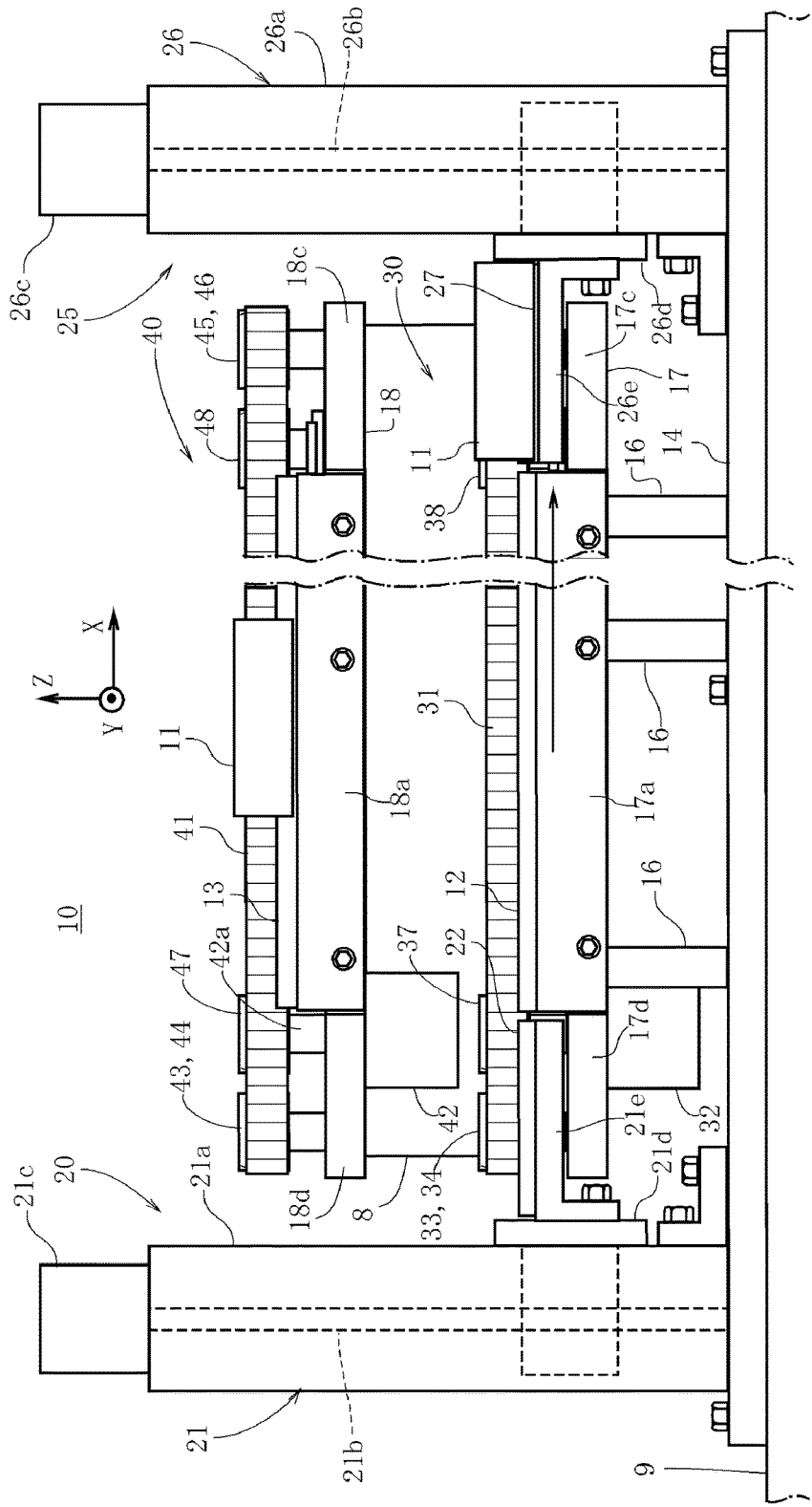
FIG. 2 is a front view of the pallet carrying apparatus showing a state after a pallet has been carried along a first pallet rail and before the pallet is moved to a second pallet rail.
Figure 3:
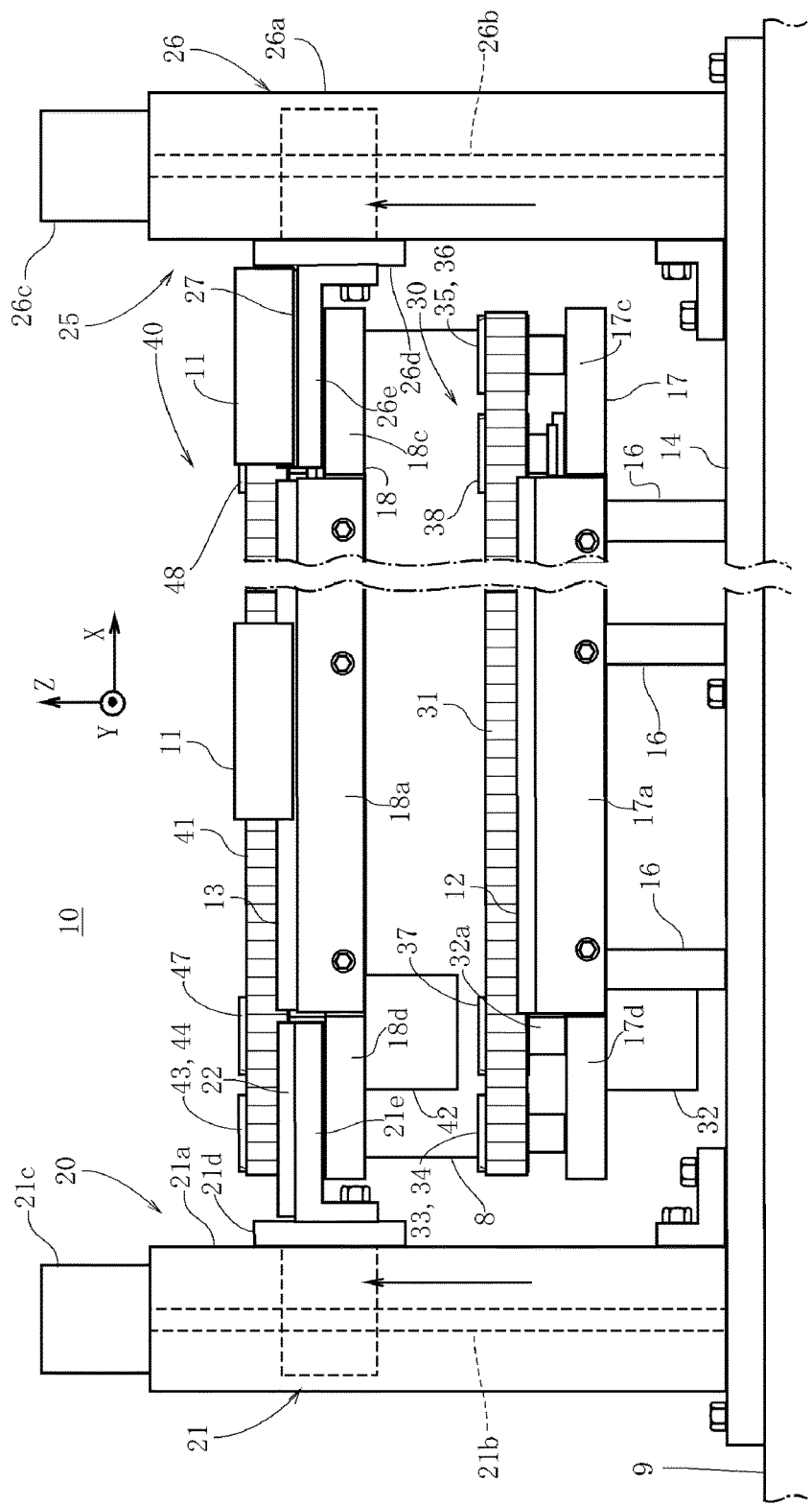
FIG. 3 is a front view of the pallet carrying apparatus showing a state after the pallet has been moved to the second pallet rail and before the pallet is carried along the second pallet rail.
Figure 4:
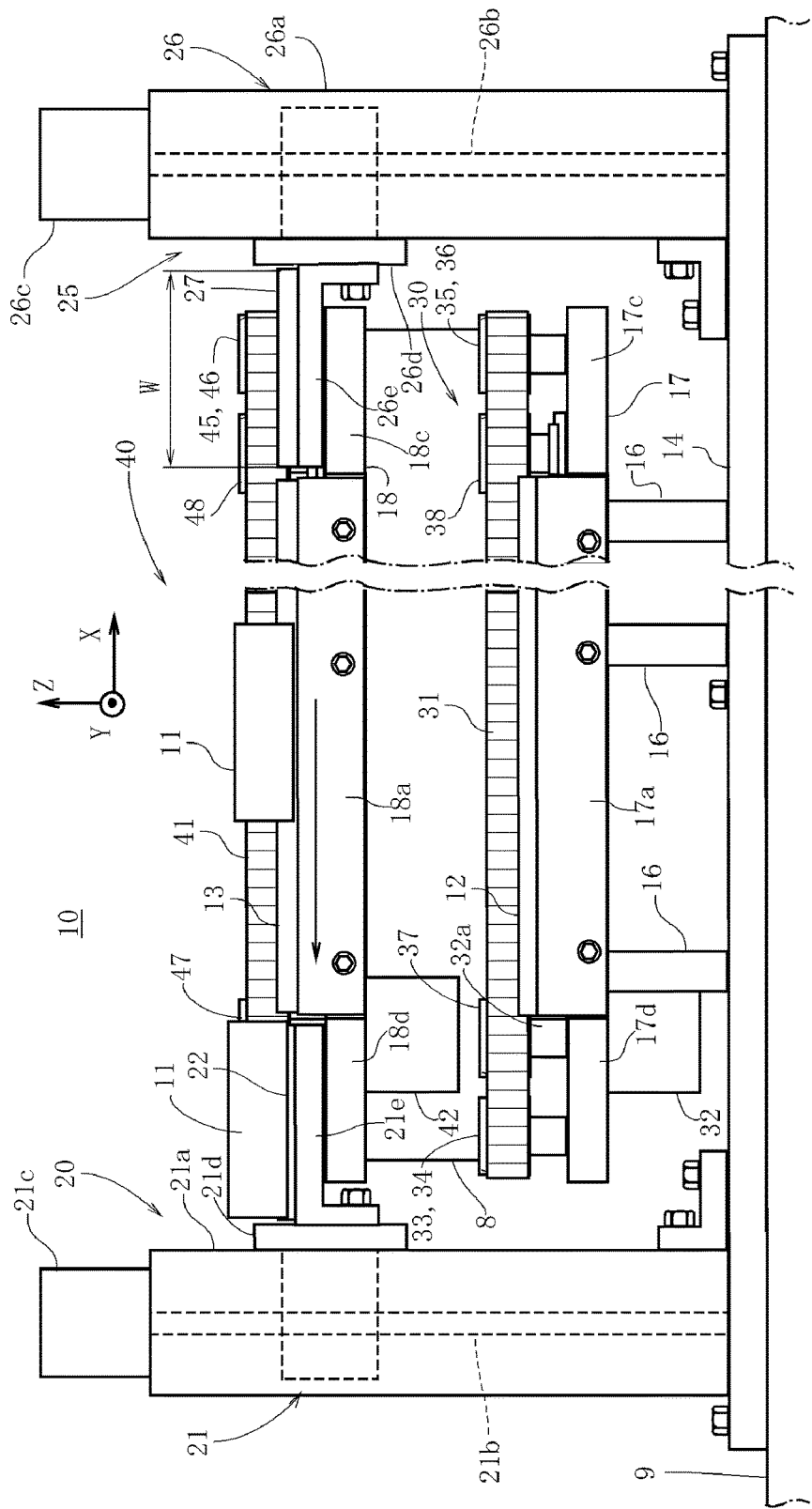
FIG. 4 is a front view of the pallet carrying apparatus showing a state after the pallet has been carried along the second pallet rail and before the pallet is moved to the first pallet rail.

The first and second movable rails 22, 27 are configured so as to: be connected linearly to the first pallet rail 12 at a mostly lowered position (a lowermost position), as shown in FIGS. 1 and 2; and be connected linearly to the second pallet rail 13 at a mostly raised position (an uppermost position), as shown in FIGS. 3 and 4.

Here, a length W (see FIG. 4) of the first and second movable rails 22, 27 in the X axis direction is set to be to the same as or longer than the length L (see FIG. 6) of the pallet 11 in the X axis direction. In other words, the first and second movable rails 22, 27 are configured so as to be capable of moving in the vertical direction while mounting the pallet 11 thereon.

As shown in FIG. 6, the pallets 11 are disposed at the same pitch as the pitch P serving as the interval at which the respective machine tools 1 to 5, and one of the pallets 11 is mounted on each of the first and second movable rails 22, 27. In other words, an interval between the first movable rail 22 and the second movable rail 27 in the X axis direction is set to an integral multiple of the pitch P of the pallets 11, and the elevating actuators 21, 26 are disposed on the attachment plate 14 so as to satisfy this setting.

Returning to FIG. 1, the configuration of the pallet carrying apparatus 10 will be described further. The pallet carrying apparatus 10 further includes a first pallet feeding mechanism 30 that carries the pallets 11 along the first pallet rail 12, and a second pallet feeding mechanism 40 that carries the pallets 11 along the second pallet rail 13.

The first pallet feeding mechanism 30 and the second pallet feeding mechanism 40 have the same structure. The first pallet feeding mechanism 30 is provided on the first horizontal plate 17, and the second pallet feeding mechanism 40 is provided on the second horizontal plate 18 positioned above the first horizontal plate 17.

The first pallet feeding mechanism 30 includes a first endless belt 31 that is configured to be capable of engaging with the pallet 11 and circulates along the first pallet rail 12, and a first servo motor 32 serving as a circulating mechanism that causes the first endless belt 31 to circulate. Similarly, the second pallet feeding mechanism 40 includes a second endless belt 41 that is configured to be capable of engaging with the pallet 11 and circulates along the second pallet rail 13, and a second servo motor 42 serving as a circulating mechanism that causes the second endless belt 41 to circulate.

The pallet feeding mechanisms will be described using the second pallet feeding mechanism 40 provided on the second horizontal plate 18 as a representative. As shown in FIG. 6, idle pulleys 43 to 46 are rotatably provided respectively in substantially four corners of the second horizontal plate 18. The second endless belt 41 is wound around the four idle pulleys 43 to 46 so as to enclose these pulleys. It should be noted that tension of the second endless belt 41 is set so that part of the belt positioned between the idle pulleys 44, 45 on the second pallet rail 13 side is substantially parallel to the second pallet rail 13.

The second endless belt 41 is configured so that the belt that is parallel to the second pallet rail 13 reaches the first movable rail 22 and the second movable rail 27 continuing to the second pallet rail 13. It should be noted that cutouts 18c, 18d for preventing interference between the pallets 11 and the second horizontal plate 18 when the pallets 11 mounted on the first movable rail 22 and the second movable rail 27 are raised and lowered are formed in the corner portions of the second horizontal plate 18 positioned at both ends of the second pallet rail 13.

Further, a second drive pulley 47 and a second driven pulley 48 are provided on both sides of the second horizontal plate 18 in the longitudinal direction so as to press the second endless belt 41 inward from the both sides in the longitudinal direction (the X axis direction). The second drive pulley 47 is driven by the second servo motor 42 serving as the circulating mechanism. The second servo motor 42 is fixed to the second horizontal plate 18, and the second drive pulley 47 is attached to a rotary shaft 42a of the second servo motor 42.

When the second servo motor 42 is driven on the basis of a command from a controller (not shown in the drawings), the rotary shaft 42a of the second servo motor 42 rotates together with the second drive pulley 47, whereby the second endless belt 41 wound around the second drive pulley 47 circulates at a state of being wound around the four idle pulleys 43 to 46.

On the other hand, the second driven pulley 48 is attached rotatably to the second attachment plate 18 via a position adjusting mechanism 49. As shown in FIG. 6, the position adjusting mechanism 49 includes: a rail 49a installed on the second horizontal plate 18 so as to extend parallel to the second pallet rail 13; a base portion 49b movably provided on the rail 49a; a support base 49c attached to the second horizontal plate 18; and a screw member 49d provided on the support base 49c so as to move the base portion 49b along the rail 49a.

The second driven pulley 48 is disposed rotatably on the base portion 49b of the position adjusting mechanism 49. By moving the base portion 49b by means of the screw member 49d, a position of the second driven pulley 48 in the X axis direction is adjusted. By adjusting the position of the second driven pulley 48 in the X axis direction in this manner, the tension of the second endless belt 41 wound around the pulleys 43, 44, 45, 46, 47, 48 can be adjusted.

It should be noted that the first pallet feeding mechanism 30 is configured in the similar to the second pallet feeding mechanism 40. As shown in FIG. 4, the first pallet feeding mechanism 30 is constituted by: idle pulleys 33 to 36, a first drive pulley 37 and a first driven pulley 38 provided on the first horizontal plate 17; and the first endless belt 31 wound around these pulleys 33 to 36, 37, 38. The first drive pulley 37 is driven by the first servo motor 32 serving as the circulating mechanism. The first servo motor 32 is fixed to the first horizontal plate 17, and the first drive pulley 37 is attached to a rotary shaft 32a of the first servo motor 32. The first pallet feeding mechanism 30 also includes a position adjusting mechanism capable of adjusting a position of the first driven pulley 38 in the X axis direction in order to adjust tension of the first endless belt 31.

The first and second endless belts 31, 41 are so-called toothed belts. Since the first and second endless belts 31, 41 have the same structure, the second endless belt 41 will be described as a representative. As shown in an enlarged view in FIG. 6, the second endless belt 41 is configured so that concave portions 41a and convex portions 41b each extending in a belt width direction are formed continuously and alternately in a belt longitudinal direction. Hereinafter, the concave portions 41a and the convex portions 41b will be referred to collectively as indentations 41a, 41b. In this manner, an outside surface of the second endless belt 41 is formed in a wave shape.

The second endless belt 41 is wound around the idle pulleys 43 to 46 provided on the second horizontal plate 18, and disposed so that the belt width direction corresponds with the vertical direction (the Z axis direction).

As shown in FIGS. 1 to 4, the first horizontal plate 17 on which the first endless belt 31 is provided and the second horizontal plate 18 on which the second endless belt 41 is provided are provided parallel to each other at a predetermined interval in the vertical direction. For this reason, the first endless belt 31 and the second endless belt 41 are disposed at the predetermined interval in the vertical direction so that each of the belt width directions thereof corresponds with the vertical direction.

On the other hand, as shown in the enlarged view in FIG. 6, convex portions 19a and concave portions 19b capable of engaging with the indentations 31a, 31b of the first endless belt 31 and the indentations 41a, 41b of the second endless belt 41 are formed on the locking member 19 of the pallet 11. The locking member 19 is a member attached to a side surface of the seat 11b of the pallet 11 on the belt side, and the convex portions 19a and concave portions 19b of the locking member 19 are formed continuously and alternately in the longitudinal direction so as to extend in the vertical direction. Hereinafter, the convex portions 19a and concave portions 19b of the locking member 19 will be referred to collectively as concavo-convex portions 19a, 19b of the pallet 11.

As shown in FIG. 5, a support member 17b that presses the first endless belt 31 from a rear side along the longitudinal direction is provided on the first horizontal plate 17, and a support member 18b that presses the second endless belt 41 from a rear side along the longitudinal direction is provided on the second horizontal plate 18.

Since the first support member 17b and the second support member 18b have the same structure, the support member 18b provided on the second horizontal plate 18 will be described as a representative. As shown in the enlarged view in FIG. 6, in a case where the concavo-convex portions 19a, 19b of the pallet 11 engage with the indentations 41a, 41b of the second endless belt 41, the support member 18b presses the second endless belt 41 from the rear side, thereby preventing the second endless belt 41 from sagging. In this manner, the support member 18 prevents the engagement between the concavo-convex portions 19a, 19b of the pallet 11 and the indentations 41a, 41b of the second endless belt 41 from being released due to a situation in which the sagging second endless belt 41 floats up from the locking member 19 of the pallet 11.

As shown in FIG. 6, in a case where the concavo-convex portions 19a, 19b of the pallets 11 engage with the indentations 31a, 31b of the first endless belt 31 or the indentations 41a, 41b of the second endless belt 41, the pallets 11 are prohibited from moving in the X axis direction independently of the first and second endless belts 31, 41. In the engagement state in this manner, the pallets 11 move together with the first and second endless belts 31, 41 so as to be carried along the first and second pallet rails 12, 13.

Further, the indentations 31a, 31b of the first endless belt 31, the indentations 41a, 41b of the second endless belt 41, and the concavo-convex portions 19a, 19b of the pallets 11 are formed so as to extend in the vertical direction (the Z axis direction). For this reason, when the pallets 11 are raised and lowered in the vertical direction, the concavo-convex portions 19a, 19b of the pallets 11 deviate in the vertical direction relative to the indentations 31a, 31b of the first endless belt 31 and the indentations 41a, 41b of the second endless belt 41. This causes the latch members 19 of the pallets 11 to deviate from the first and second endless belts 31, 41 and the engagement state between the pallets 11 and the first and second endless belts 31, 41 are thereby released. Then, when the pallets 11 are raised and lowered to the position of the other of the first and second endless belts 31, 41 again, the concavo-convex portions 19a, 19b of the pallets 11 engage with these belts 31, 41.

In the pallet carrying apparatus 10, as described above, the engagement state between the pallets 11 and the first and second endless belts 31, 41 are released by raising and lowering the first and second movable rails 22, 27, on which the pallets 11 are to be mounted, and separating the first and second movable rails 22, 27 from the first and second pallet rails 12, 13. In contrast, the pallets 11 engage with the first and second endless belts 31, 41 by raising and lowering the first and second movable rails 22, 27 and linearly connecting the first and second movable rails 22, 27 to the first and second pallet rails 12, 13.

Next, a method of carrying the pallet 11 using the pallet carrying apparatus 10 will be described.

This method of carrying the pallet 11 using the pallet carrying apparatus 10 includes: a first pallet carrying step for carrying the pallet 11 along the first pallet rail 12; a first pallet moving step for moving the pallet 11 from the first pallet rail 12 to the second pallet rail 13; a second pallet carrying step for carrying the pallet 11 along the second pallet rail 13; and a second pallet moving step for moving the pallet 11 from the second pallet rail 13 to the first pallet rail 12.

In the pallet carrying method according to the present embodiment, the pallet 11 is carried using the pallet carrying apparatus 10. In the pallet carrying apparatus 10, the first pallet rail 12 and the second pallet rail 13 are provided parallel to each other at a predetermined interval in the vertical direction. The indentations 31a, 31b each extending in the belt width direction are formed in the first endless belt 31 that carries the pallet 11, and the first endless belt 31 is disposed so that the width direction thereof corresponds with the vertical direction. Further, the indentations 41a, 41b each extending in the belt width direction are formed in the second endless belt 41 that carries the pallet 11, and the second endless belt 41 is disposed so that the width direction thereof corresponds with the vertical direction. The concavo-convex portions 19a, 19b are formed in the pallet 11 so as to be capable of engaging with the indentations 31a, 31b of the first endless belt 31 and the indentations 41a, 41b of the second endless belt 41.

In the pallet carrying apparatus 10, the pallets 11 are carried counterclockwise in FIG. 1. In the pallet carrying apparatus 10, each of the machine tools 1 to 5 (see FIG. 6) performs predetermined processing onto the workpieces that are placed on the pallets 11 positioned on the second pallet rail 13. Hereinafter, each of the steps of the pallet carrying method will be described.

(First Pallet Carrying Step)

In the first pallet carrying step, the pallet 11 mounted on the first pallet rail 12 positioned below the second pallet rail 13 is carried.

In this step, since the pallet 11 is moved along the first pallet rail 12, it is necessary to mount the pallet 11 on the first pallet rail 12.

As shown in FIG. 1, for example, the first movable rail 22 on which the pallet 11 is mounted is lowered, thereby linearly connecting the first movable rail 22 and the first pallet rail 12 to each other. When the first movable rail 22 and the pallet 11 are lowered after passing through the cutout 17d of the first horizontal plate 17 and the first movable rail 22 is connected to the first pallet rail 12, the concavo-convex portions 19a, 19b of the pallet 11 mounted on the first movable rail 22 engage with the indentations 31a, 31b of the first endless belt 31 extending parallel to the first pallet rail 12.

As shown in FIG. 3, the pallet 11 may be disposed on the first pallet rail 12 from an end portion of the first pallet rail 12 in a state where the first and second movable rails 22, 27 are raised. Even in a case of configuring them in this manner, the concavo-convex portions 19a, 19b of the pallet 11 can engage with the indentations 31a, 31b of the first endless belt 31.

After the concavo-convex portions 19a, 19b of the pallet 11 engage with the indentations 31a, 31b of the first endless belt 31, the servo motor 32 of the first pallet feeding mechanism 30 is driven to cause the first endless belt 31 to circulate. As shown in FIGS. 1 and 2, this causes the pallet 11 that engages with the first endless belt 31 to be carried from a left side to a right side in the drawings along the first pallet rail 12.

It should be noted that the pallet carrying apparatus 10 is configured so that each of the machine tools 1 to 5 (see FIG. 6) performs predetermined processing onto the workpieces placed on the pallets 11 mounted on the second pallet rail 13. Therefore, the pallets 11 on the first pallet rail 12 are merely carried from the first movable rail 22 toward a right end of the first pallet rail 12.

(First Pallet Moving Step)

In the first pallet moving step, the pallet 11 is raised from the first pallet rail 12 to the second pallet rail 13.

First, as shown in FIG. 2, the second movable rail 27 is lowered to a lowered position by means of the second pallet moving mechanism 25, thereby continuously connecting the second movable rail 27 to the first pallet rail 12. Then, the pallet 11 is moved from the end portion of the first pallet rail 12 to the second movable rail 27 by means of the first pallet feeding mechanism 30.

After moving the pallet 11 to the second movable rail 27, the second movable rail 27 is raised to a raised position, as shown in FIG. 3, thereby continuously connecting the second movable rail 27 to the second pallet rail 13. In other words, the second movable rail 27 on which the pallet 11 is mounted is raised to a predetermined raised position, and then, stopped in a state of being connected to the second pallet rail 13. When the second movable rail 27 is raised so as to separate from the first pallet rail 12, the engagement between the pallet 11 and the first endless belt 31 is released. For this reason, a raising motion of the second movable rail 27 is not inhibited.

At this time, it is preferable that the first movable rail 22 and the second pallet rail 13 are connected continuously by raising the first movable rail 22 using the elevating actuator 21 of the first pallet moving mechanism 20.

(Second Pallet Carrying Step)

In the second pallet carrying step, the pallet 11 mounted on the second pallet rail 13 is carried.

When the second movable rail 27 was linearly connected to the second pallet rail 13 in the first pallet moving step, the pallet 11 on the second movable rail 27 engages with the second endless belt 41 provided along the second pallet rail 13, as shown in FIG. 5. Then, when the servo motor 42 of the second pallet feeding mechanism 40 is driven to cause the second endless belt 41 to circulate, the pallet 11 moves from the second movable rail 27 to the second pallet rail 13, and is carried along the second pallet rail 13, as shown in FIG. 4.

The servo motor 42 is controlled so that each pallet 11 stops temporarily at a position facing each of the machine tools 1 to 5. The pallet 11 on the second pallet rail 13 is moved from a right end to a left end of the second pallet rail 13 while carrying and stopping the pallet 11 repeatedly in this manner.

In a case where the first movable rail 22 is connected to the second pallet rail 13 as shown in FIG. 4, the pallet 11 on which the workpiece that has undergone the processing of all of the machine tools 1 to 5 is to be placed is carried onto the first movable rail 22 from the left end of the second pallet rail 13.

(Second Pallet Moving Step)

In the second pallet moving step, the pallet 11 is lowered from the second pallet rail 13 to the first pallet rail 12 using the first pallet moving mechanism 20.

In the second pallet moving step, the first movable rail 22 at the raised position shown in FIG. 4 is lowered to the lowered position shown in FIG. 1 by means of the first pallet moving mechanism 20. In other words, the first movable rail 22 on which the pallet 11 is mounted is lowered to a predetermined lowered position, and then, stopped in a state of being connected to the first pallet rail 12. When the first movable rail 22 is lowered so as to separate from the second pallet rail 13, the engagement between the pallet 11 and the second endless belt 41 is released. For this reason, a lowering motion of the first movable rail 22 is not inhibited.

When the first movable rail 22 was linearly connected to the first pallet rail 12 in the second pallet moving step, the pallet 11 on the first movable rail 22 engages with the first endless belt 31 provided along the first pallet rail 12.

At this time, it is preferable that the second movable rail 27 and the first pallet rail 12 are connected by lowering the second movable rail 27 using the elevating actuator 26 of the second pallet moving mechanism 25.

In the pallet carrying apparatus 10, by moving one pitch of a carrying cycle shown in FIGS. 1 to 4, it is possible to carry the respective pallets 11 counterclockwise by one pitch at a time. Further, every time the movement of one pitch in the carrying cycle shown in FIGS. 1 to 4 is performed once, each of the machine tools 1 to 5 (see FIG. 6) is operated in a state of stopping carrying the pallets 11. As a result, various types of processing, such as inserting an insulating member, swaging and welding lead wires for coils of respective phases, are performed onto the workpieces placed on the pallets 11 arranged on the second pallet rail 13. At the time of operations of the machine tools 1 to 5, a workpiece is carried in and out any of pallets 11 on the second pallet rail 13.

In the pallet carrying apparatus 10 and the pallet carrying method according to the present embodiment, each of the pallets 11 is moved along the first pallet rail 12 in a state of engaging with the first endless belt 31, and moved along the second pallet rail 13 in a state of engaging with the second endless belt 41. By configuring the pallet carrying apparatus 10 in this manner, the pallets 11 can be carried at a high speed and further be stopped at the predetermined positions reliably even though weight of the workpiece to be mounted on the pallet 11 is comparatively heavy. As a result, it is possible to heighten productivity.

In the pallet carrying apparatus 10 and the pallet carrying method according to the present embodiment, the pallets 11 are configured so as to be capable of engaging with the first and second endless belts 31, 41, and the pallets 11 that engage with the first and second endless belts 31, 41 are carried along the first and second pallet rail 12, 13. By varying engagement positions between the pallets 11 and the first and second endless belts 31, 41, it is possible to readily modify an interval between the adjacent pallets 11 on the first and second pallet rail 12, 13, that is, a carrying pitch of the pallets 11.

In the pallet carrying apparatus 10 and the pallet carrying method according to the present embodiment, the first pallet rail 12 and the second pallet rail 13 are provided parallel to each other at the predetermined interval in the vertical direction, and the machine tools 1 to 5 are disposed at the front side or the rear side of the first and second pallet rails 12, 13. Since the machine tools 1 to 5 are not disposed between the first and second pallet rails 12, 13 in this manner, a distance between the first and second pallet rails 12, 13 does not becomes enlarged even though the machine tools 1 to 5 are comparatively large apparatuses. Therefore, it is possible to suppress an occupied area of the pallet carrying apparatus 10 from increasing even in a case where the machine tools 1 to 5 are disposed.

Further, the first and second pallet moving mechanisms 20, 25 are configured so as to move the pallets 11 to the first pallet rail 12 or the second pallet rail 13 by raising and lowering the pallets 11 in the vertical direction. An elevation movement distance of the pallet 11 is a predetermined distance in the vertical direction of the first and second pallet rails 12, 13. The predetermined distance is set to a thickness of the pallet 11 in the vertical direction, or a thickness of the pallet 11 including the workpiece in the vertical direction in the case of placing a workpiece on the pallet 11. Therefore, it is possible to significantly shorten the distance by which the pallet moving mechanisms 20, 25 move (raise and lower) the pallets 11 in comparison with the conventional pallet carrying apparatus in which the pallets are moved so as to cross the machine tools in the horizontal direction. As a result, it is possible to shorten a movement time of the pallets 11 by means of the pallet moving mechanisms 20, 25, and this makes it possible to carry the pallets 11 quickly.

The first endless belt 31 is disposed so that an extending direction of the indentations 31a, 31b corresponds with the vertical direction, and the second endless belt 41 is disposed so that an extending direction of the indentations 41a, 41b corresponds with the vertical direction. The concavo-convex portions 19a, 19b capable of engaging with the indentations 31a, 31b of the first endless belt 31 and the indentations 41a, 41b of the second endless belt 41 are formed in the pallet 11. The pallet 11 is configured so that the concavo-convex portions 19a, 19b engage with the indentations 31a, 31b of the first endless belt 31 when the pallet 11 is lowered to the first pallet rail 12, and so that the concavo-convex portions 19a, 19b engage with the indentations 41a, 41b of the second endless belt 41 when the pallet 11 is raised to the second pallet rail 13. For this reason, by merely raising and lowering the pallet 11, it is possible to cause the pallet 11 to engage with the first and second endless belts 31, 41 easily, and there is no need for a complicated engaging unit. As a result, the pallets 11 can be carried quickly.

Furthermore, since the belt width directions of the first and second endless belts 31, 41 correspond with the vertical direction, the first and second endless belts 31, 41 hardly sag due to their own weight, and are hardly affected by the weight of the workpieces placed on the pallets 11 further. This makes it possible to prevent a deviation in the carrying position called as "skipping a step" and prevent the pallets 11 from deviating from the first and second endless belts 31, 41 due to belt sagging. This makes it possible to carry the pallets 11 at a higher speed and with greater stability than in the prior art. It should be noted that in a case where sagging of the first and second endless belts 31, 41 in the width direction becomes a problem, this problem can be solved by providing the predetermined number of bearings or the like each having a U-shaped groove in an outer circumference thereof just below the belts.

In the pallet carrying apparatus 10 according to the present embodiment, the concavo-convex portions 19a, 19b capable of engaging with the indentations 31a, 31b of the first endless belt 31 and the indentations 41a, 41b of the second endless belt 41 are formed at only one side surface of the pallet 11. Therefore, in the pallet carrying apparatus 10 according to the present embodiment, it is possible to reduce the number of components of the pallet 11 in comparison with the conventional pallet carrying apparatus required to form engagement portions for engaging with the belt on both sides of the pallet. This makes it possible to reduce a manufacturing cost.

As described above, although the embodiment of the present invention has been explained, the above embodiment is merely one example of application of the present invention, and the technical scope of the present invention is not limited to the specific configurations of the above embodiment.

In the embodiment described above, the case where the pallets 11 are carried in the counterclockwise direction of FIG. 1 has been described. However, the pallet carrying apparatus 10 may be configured so as to carry the pallets 11 in a clockwise direction instead of the counterclockwise direction.

This application claims priority based on Japanese Patent Application No. 2013-79268, filed with the Japan Patent Office on Apr. 5, 2013, the entire content of which is incorporated into this specification by reference.

The invention claimed is:

1. A pallet carrying apparatus configured to carry one or more pallets on which a workpiece can be placed, comprising:
    a first pallet rail on which the pallet is movably mounted;
    a second pallet rail on which the pallet is movably mounted, the second pallet rail being provided parallel to the first pallet rail at a predetermined interval in an up-down direction;
    a first pallet feeding mechanism including a first endless belt, the first endless belt being configured to circulate along the first pallet rail, convex portions and concave portions being formed on the first endless belt continuously and alternately in a belt longitudinal direction so that each of the convex portions and the concave portions extends in a belt width direction;
    a second pallet feeding mechanism including a second endless belt, the second endless belt being configured to circulate along the second pallet rail, convex portions and concave portions being formed continuously and alternately in the belt longitudinal direction so that each of the convex portions and the concave portions extends in the belt width direction; and
    a pallet moving mechanism configured to move the pallet from one of the first pallet rail and the second pallet rail to the other of the first pallet rail and the second pallet rail,
    wherein the first endless belt and the second endless belt are provided at a predetermined interval in the up-down direction, and disposed so that each of the belt width direction thereof corresponds with the up-down direction, wherein the pallet includes a linear motion block capable of moving on the first and second pallet rails, and a seat provided on the linear motion block, and wherein concavo-convex portions are provided on a side surface of the seat, the concavo-convex portions being configured to engage with the convex portions and the concave portions of the first endless belt in a case where the pallet is lowered to the first pallet rail by the pallet moving mechanism, and to engage with the convex portions and the concave portions of the second endless belt in a case where the pallet is raised to the second pallet rail by the pallet moving mechanism.

2. The pallet carrying apparatus according to claim 1, wherein the pallet moving mechanism includes:

a first pallet moving mechanism disposed at a side of one ends of the first pallet rail and the second pallet rail; and a second pallet moving mechanism disposed at a side of the other ends of the first pallet rail and the second pallet rail, wherein the first pallet moving mechanism includes:

a first movable rail that carries the pallet movably; and a first elevating actuator that raises and lowers the first movable rail between a lowered position in which the first movable rail is directly connected to the first pallet rail and a raised position in which the first movable rail is directly connected to the second pallet rail, and wherein the second pallet moving mechanism includes:

a second movable rail that carries the pallet movably; and a second elevating actuator that raises and lowers the second movable rail between a lowered position in which the second movable rail is directly connected to the first pallet rail and a raised position in which the second movable rail is directly connected to the second pallet rail.

3. The pallet carrying apparatus according to claim 1, further comprising:

a plurality of machine tools provided on a front side or a rear side of the first pallet rail and the second pallet rail so as to be arranged along the rails, each of the plurality of machine tools performing predetermined processing for the workpiece placed on the pallet mounted on the second pallet rail.

4. A pallet carrying method using the pallet carrying apparatus as defined in claim 1, comprising:

a first pallet carrying step in which the pallet engaged with the first endless belt is carried along the first pallet rail by the first pallet feeding mechanism;

a second pallet carrying step in which the pallet engaged with the second endless belt is carried along the second pallet rail by the second pallet feeding mechanism;

a first pallet moving step in which the pallet is raised from the first pallet rail to the second pallet rail by the pallet moving mechanism so that engagement between the concavo-convex portions of the pallet and the convex portions and the concave portions of the first endless belt is released and the concavo-convex portions of the pallet engage with the convex portions and the concave portions of the second endless belt; and a second pallet moving step in which the pallet is lowered from the second pallet rail to the first pallet rail by the pallet moving mechanism so that engagement between the concavo-convex portions of the pallet and the convex portions and the concave portions of the second endless belt is released and the concavo-convex portions of the pallet engage with the convex portions and the concave portions of the first endless belt.

5. The pallet carrying apparatus of claim 1, wherein the pallet moving mechanism includes an elevating actuator having a first upward-facing surface on which the pallet rests when the pallet moving mechanism raises the pallet in an upward direction from the first rail to the second rail, and on which the pallet rests when the pallet moving mechanism lowers the pallet downward from the second rail to the first rail.

* * * * *